(12) United States Patent
Oda et al.

(10) Patent No.: US 10,374,701 B2
(45) Date of Patent: Aug. 6, 2019

(54) OPTICAL SIGNAL-TO-NOISE RATIO MEASURING DEVICE AND OPTICAL SIGNAL-TO-NOISE RATIO MEASURING METHOD

(71) Applicant: FUJITSU LIMITED, Kawasaki-shi, Kanagawa (JP)

(72) Inventors: Shoichiro Oda, Fuchu (JP); Setsuo Yoshida, Inagi (JP); Keisuke Harada, Fukuoka (JP)

(73) Assignee: FUJITSU LIMITED, Kawasaki (JP)

( * ) Notice: Subject to any disclaimer, the term of this patent is extended or adjusted under 35 U.S.C. 154(b) by 135 days.

(21) Appl. No.: 15/418,335

(22) Filed: Jan. 27, 2017

(65) Prior Publication Data

US 2017/0230112 A1 Aug. 10, 2017

(30) Foreign Application Priority Data

Feb. 4, 2016 (JP) .................. 2016-020118

(51) Int. Cl.
*H04B 10/60* (2013.01)
*H04B 10/077* (2013.01)
*H04B 10/079* (2013.01)

(52) U.S. Cl.
CPC ..... *H04B 10/07953* (2013.01); *H04B 10/079* (2013.01); *H04B 10/0775* (2013.01); *H04B 10/0791* (2013.01); *H04B 10/07955* (2013.01); *H04B 10/60* (2013.01)

(58) Field of Classification Search
CPC .......... H04B 10/07953; H04B 10/0791; H04B 10/079; H04B 10/0775; H04B 10/077; H04B 10/07955; H04B 10/60; H04B 10/08; H04J 14/02

USPC ..................................................... 398/26, 188
See application file for complete search history.

(56) References Cited

U.S. PATENT DOCUMENTS

| | | | | |
|---|---|---|---|---|
| 8,130,878 | B2* | 3/2012 | Song | H04B 17/345 375/148 |
| 9,219,488 | B2* | 12/2015 | Mukai | H03M 1/0629 |
| 9,404,738 | B2* | 8/2016 | Toom | G01C 7/04 |
| 9,515,727 | B2* | 12/2016 | Yang | H04B 10/07955 |
| 9,843,435 | B2* | 12/2017 | Li | H04B 1/0057 |
| 2003/0054783 | A1* | 3/2003 | Mason | H03H 11/1291 455/150.1 |
| 2003/0071925 | A1* | 4/2003 | Kanno | H03D 7/165 348/726 |
| 2004/0126108 | A1* | 7/2004 | Chung | H04B 10/077 398/26 |

(Continued)

FOREIGN PATENT DOCUMENTS

JP 2015-106905 6/2015

*Primary Examiner* — Abbas H Alagheband
(74) *Attorney, Agent, or Firm* — Fujitsu Patent Center

(57) ABSTRACT

An optical signal-to-noise ratio (OSNR) measuring device includes a processor, wherein the processor executes a process. The process includes: converting an optical signal to an electrical signal; first acquiring a signal intensity from the electrical signal; second acquiring a noise intensity of a predetermined frequency band from the electrical signal; performing a digital conversion on the noise intensity; and computing an OSNR of the optical signal based on the signal intensity and the converted noise intensity. The predetermined frequency band is a frequency band including a folding noise that occurs when the digital conversion is performed.

5 Claims, 10 Drawing Sheets

(56) References Cited

U.S. PATENT DOCUMENTS

| | | | | |
|---|---|---|---|---|
| 2004/0223769 | A1* | 11/2004 | Hoshida | H04B 10/077 398/188 |
| 2006/0256885 | A1* | 11/2006 | Song | H04L 25/0206 375/260 |
| 2008/0240164 | A1* | 10/2008 | Zavadsky | H04J 3/0685 370/503 |
| 2011/0194657 | A1* | 8/2011 | Han | H04B 1/10 375/350 |
| 2013/0178179 | A1* | 7/2013 | Han | H04B 1/06 455/130 |
| 2015/0010299 | A1* | 1/2015 | Wei | H04B 10/07953 398/26 |
| 2015/0155934 | A1* | 6/2015 | Nakagawa | H04B 10/0775 398/34 |
| 2015/0155935 | A1* | 6/2015 | Oda | H04B 10/07953 398/26 |
| 2015/0194974 | A1* | 7/2015 | Mukai | H03M 1/0629 375/258 |
| 2016/0261340 | A1* | 9/2016 | Yang | H04B 10/07953 |

* cited by examiner

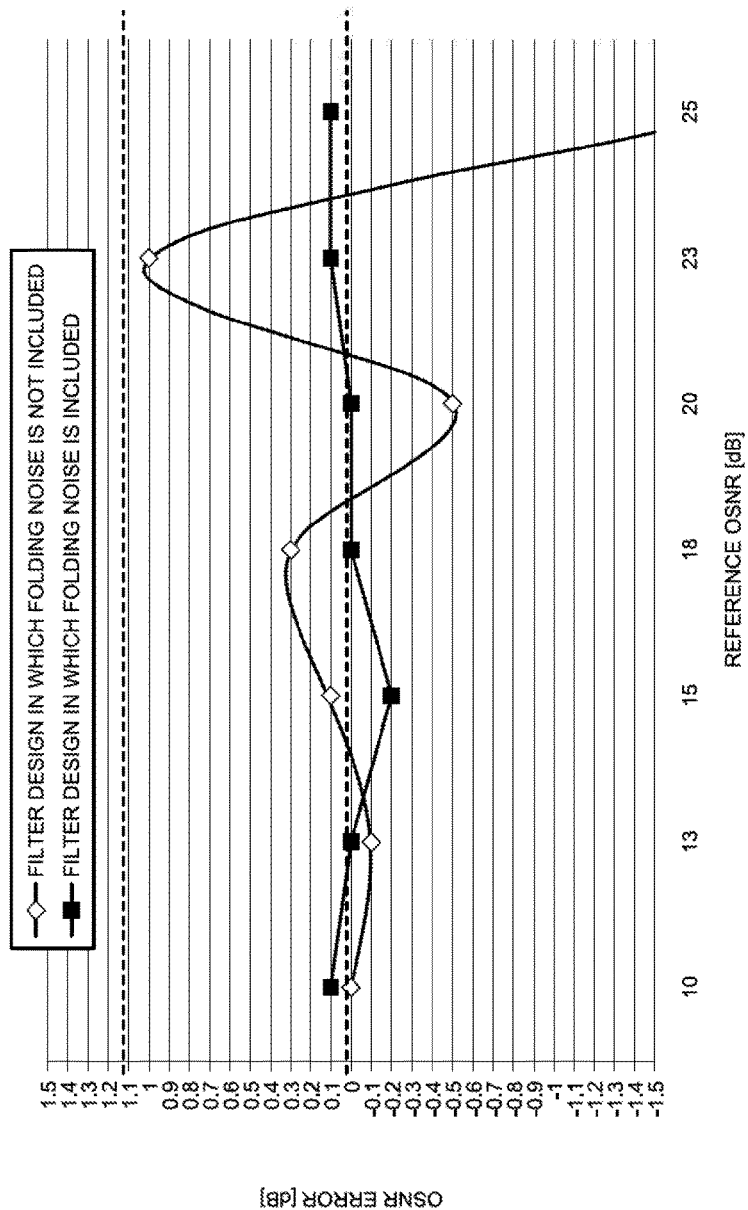

OPTICAL SIGNAL-TO-NOISE RATIO MEASURING DEVICE AND OPTICAL SIGNAL-TO-NOISE RATIO MEASURING METHOD

CROSS-REFERENCE TO RELATED APPLICATION

This application is based upon and claims the benefit of priority of the prior Japanese Patent Application No. 2016-020118, filed on Feb. 4, 2016, the entire contents of which are incorporated herein by reference.

FIELD

The embodiments discussed herein are related to an Optical Signal-to-Noise Ratio measuring device (OSNR measuring device) and an OSNR measuring method, which measure an OSNR on an optical network.

BACKGROUND

The next-generation optical network desires an OSNR measuring device that monitors an OSNR of an optical signal in operation without giving any effect to a main signal, for fault detection, early recovery from the fault, and realization of a network control technology for increasing the transmission capacity.

The OSNR measuring device receives an optical signal by using, for example, a photodiode, and measures an OSNR of the optical signal on the basis of the signal intensity of a Direct-Current component (DC component) in the received optical signal and the noise intensity of an Alternating-Current component (AC component) having passed through an optical filter. The OSNR measuring device can measure an OSNR of the optical signal in a simple configuration and at low cost.

Patent Literature 1: US Patent Application Publication No. 2015-0155935
Patent Literature 2: Japanese Laid-open Patent Publication No. 2015-106905

Recently, a super channel transmission technology for 400 G/1 T transmission uses an optical filter whose bandwidth is approximately 0.1 nm in consideration of influence of crosstalk from adjacent subcarriers because a signal band of subcarrier signals that constitute a super channel is 32 GHz and a bandwidth thereof is approximately 0.26 nm. In a super channel transmission technology, a frequency bandwidth of an optical filter is narrowed.

However, in the OSNR measuring device, deterioration in OSNR monitoring accuracy is more significant as a frequency bandwidth of an optical filter becomes narrower. For example, the amount of amplifier noise included in the noise intensity decreases relatively to an optical signal. As a result, in such a case that the bandwidth is 0.2 nm or less, the monitoring accuracy of an OSNR deteriorates as illustrated in FIG. 10.

Therefore, in order to increase the monitoring accuracy of an OSNR, it is considered to execute an averaging process and increase the monitoring accuracy of an OSNR by increasing the averaging count in the averaging process. However, because a time until the monitoring accuracy is improved is longer as the averaging count increases, measuring time of an OSNR increases.

SUMMARY

According to an aspect of an embodiment, an optical signal-to-noise ratio (OSNR) measuring device includes a processor, wherein the processor executes a process. The process includes: converting an optical signal to an electrical signal; first acquiring a signal intensity from the electrical signal; second acquiring a noise intensity of a predetermined frequency band from the electrical signal; performing a digital conversion on the noise intensity; and computing an OSNR of the optical signal based on the signal intensity and the converted noise intensity, wherein the predetermined frequency band is a frequency band including a folding noise that occurs when the digital conversion is performed.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 7 is a diagram illustrating one example of OSNR errors in pass frequency bands including a folding noise and without including a folding noise;

DESCRIPTION OF EMBODIMENTS

Preferred embodiments of the present invention will be explained with reference to accompanying drawings. In addition, the disclosed technology is not limited to the embodiments described below. Moreover, these embodiments may be appropriately combined within a consistent range.

[a] First Embodiment

Figure 1:
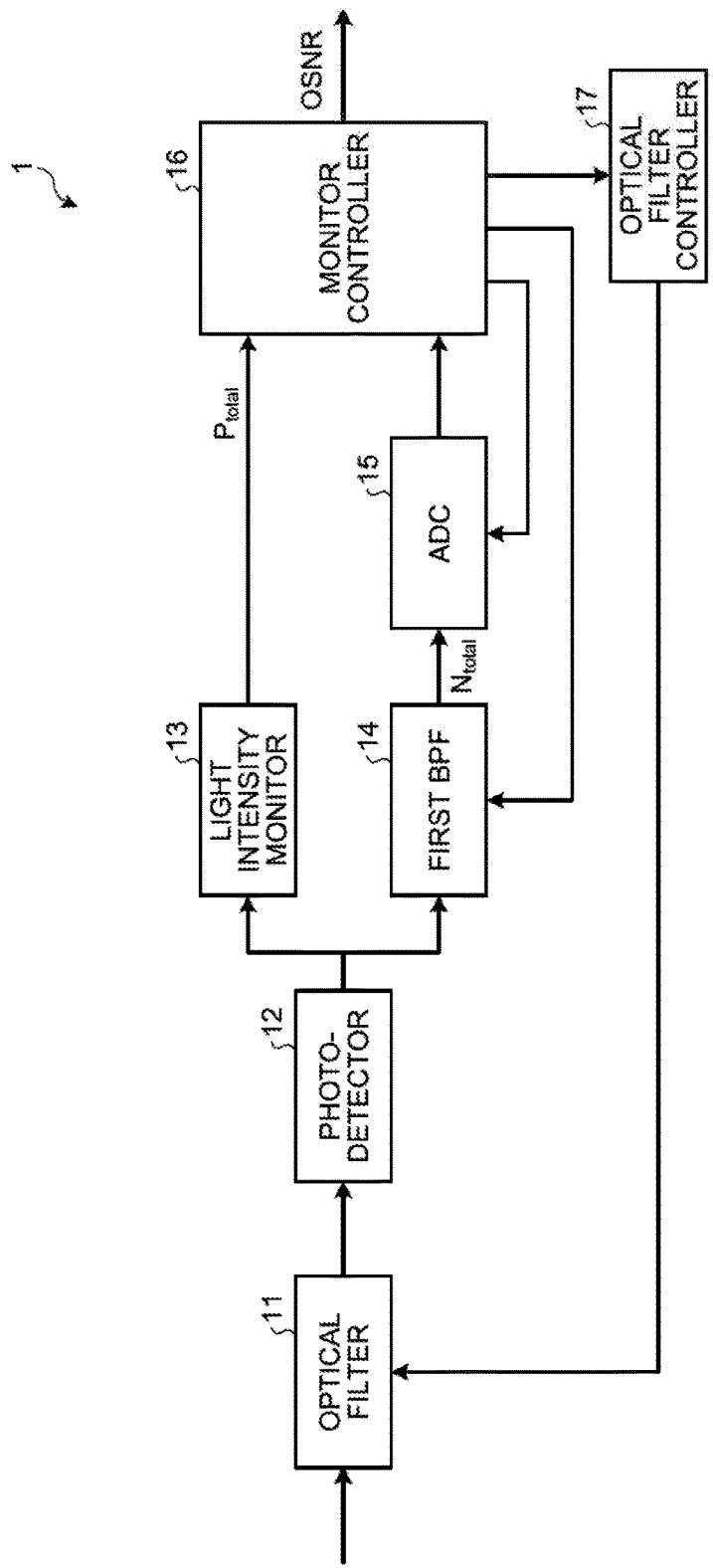
FIG. 1 is a block diagram illustrating one example of an OSNR measuring device according to a first embodiment.

FIG. 1 is a block diagram illustrating one example of an OSNR measuring device according to a first embodiment. The OSNR measuring device 1 illustrated in FIG. 1 includes an optical filter 11, a photodetector 12, a light intensity monitor 13, a first Band Pass Filter (first BPF) 14, an Analog Digital Converter (ADC) 15, a monitor controller 16, and an optical filter controller 17. The optical filter 11 is, for example, a wavelength filter that extracts a desired optical signal from, for example, a Wavelength Division Multiplex signal (WDM signal). The photodetector 12 is, for example, a photodiode that electrically converts the extracted optical signal to an electrical signal. The photodetector 12 outputs the electrically converted electrical signal to the light intensity monitor 13 and the first BPF 14.

The light intensity monitor 13 extracts a signal intensity $P_{total}$, which is a DC component of the output signal of the photodetector 12, and inputs the extracted signal intensity $P_{total}$ to the monitor controller 16. The signal intensity $P_{total}$ is, for example, a signal power of an optical signal. The signal intensity $P_{total}$ may be expressed by a formula (1).

$$P_{total} = P_{sig} + P_{ase} = P_{sig}\left(1 + \frac{1}{OSNR}\frac{B_o}{R}\right) \quad (1)$$

"$P_{sig}$" corresponds to a signal light power, "$P_{ase}$" corresponds to an Amplified Spontaneous Emission noise power (ASE noise power), "$B_o$" corresponds to an optical bandwidth, and "R" corresponds to an ASE noise bandwidth.

The first BPF 14 extracts a noise intensity $N_{total}$ that is an AC component of a predetermined frequency band and is a result of removing a DC component from an electrical signal of the photodetector 12. The noise intensity $N_{total}$ is, for example, a noise component of an optical signal including a folding noise. The noise intensity $N_{total}$ may be expressed by a formula (2)

$$N_{total} = N_{beat} + N_{shot} + N_{thermal} + N_{circuit} + N_{signal} \quad (2)$$
$$= N_{beat} + N_{nonbeat}$$

"$N_{beat}$" is a beat noise, "$N_{shot}$" is a shot noise, "$N_{thermal}$" is a thermal noise, "$N_{circuit}$" is a circuit noise, "$N_{signal}$" is a main signal component, and "$N_{nonbeat}$" is a nonbeat noise. For the convenience of explanation, the nonbeat noise $N_{nonbeat}$ will be explained to be zero.

The ADC 15 samples the noise intensity of a predetermined frequency band, which is extracted by the first BPF 14, to execute digital conversion, and inputs a digitally converted noise intensity $N_{total}$ to the monitor controller 16. The monitor controller 16 computes an Optical Signal-to-Noise Ratio (OSNR) on the basis of the signal intensity extracted in the light intensity monitor 13 and the noise intensity digitally converted in the ADC 15. The optical filter controller 17 controls the optical filter 11 to select an optical wavelength that is to be extracted in the optical filter 11.

Figure 2:
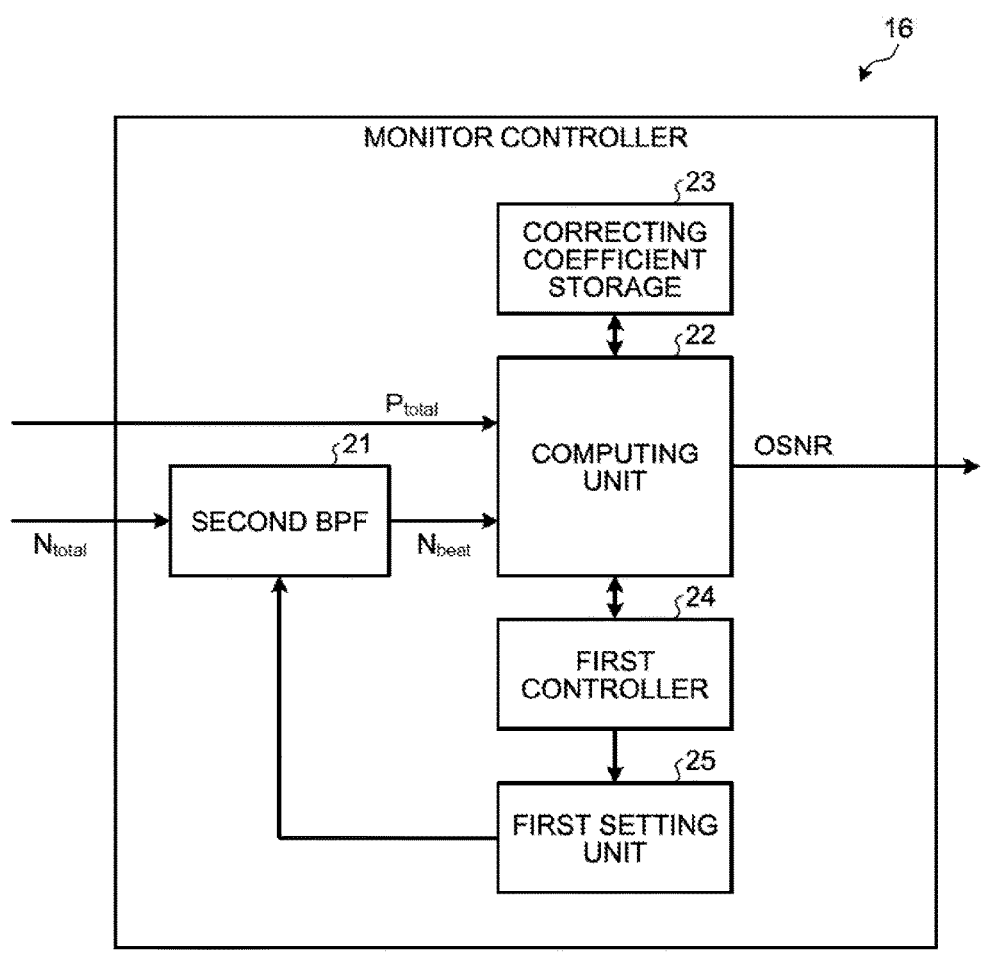
FIG. 2 is a block diagram illustrating a configuration example of a monitor controller in the OSNR measuring device according to the first embodiment.

FIG. 2 is a block diagram illustrating a configuration example of the monitor controller 16 in the OSNR measuring device 1 according to the first embodiment. The monitor controller 16 illustrated in FIG. 2 includes a second BPF 21, a computing unit 22, a correcting coefficient storage 23, a first controller 24, and a first setting unit 25. The second BPF 21, the computing unit 22, the correcting coefficient storage 23, the first controller 24, and the first setting unit 25 may be realized by using, for example, processors and memories (not illustrated). The second BPF 21 extracts the noise intensity $N_{beat}$ that is an AC component of a monitor target from the noise intensity $N_{total}$. The noise intensity $N_{beat}$ of the monitor target may be expressed by a formula (3).

$$N_{beat} = A\left(2P_{sig}P_{ase}\frac{1}{B_o} + P_{ase}^2\frac{1}{B_o}\right) \quad (3)$$
$$= 2\frac{A}{R}P_{sig}^2\left(\frac{1}{OSNR} + \frac{B_o}{2R \cdot OSNR^2}\right)$$

"A" is a correcting coefficient.

The computing unit 22 computes an OSNR by using the formulae (1) to (3) on the basis of the signal intensity $P_{total}$ of the light intensity monitor 13, the noise intensity $N_{beat}$ of a monitor target of the second BPF 21, and the correcting coefficient "A". The correcting coefficient "A" is a coefficient for computing so that an OSNR computed on the basis of the signal intensity $P_{total}$ and the noise intensity $N_{beat}$ in the computing unit 22 becomes an actual OSNR. The actual OSNR is, for example, an OSNR of an optical signal in which a known Amplified Spontaneous Emission noise (ASE noise) is added to the optical signal and an optical spectrum analyzer is used. The correcting coefficient storage 23 is a region in which the correcting coefficient "A" is stored. The first controller 24 controls whole of the monitor controller 16. The first setting unit 25 sets various setting contents of the optical filter 11, the first BPF 14, the ADC 15, and the second BPF 21. The first setting unit 25 sets the optical filter controller 17 to set an optical wavelength that is an extraction target of the optical filter 11. The first setting unit 25 sets a pass frequency band of the first BPF 14. The first setting unit 25 sets a pass frequency band of the second BPF 21. The first setting unit 25 sets a sampling frequency of the ADC 15.

Figure 3:
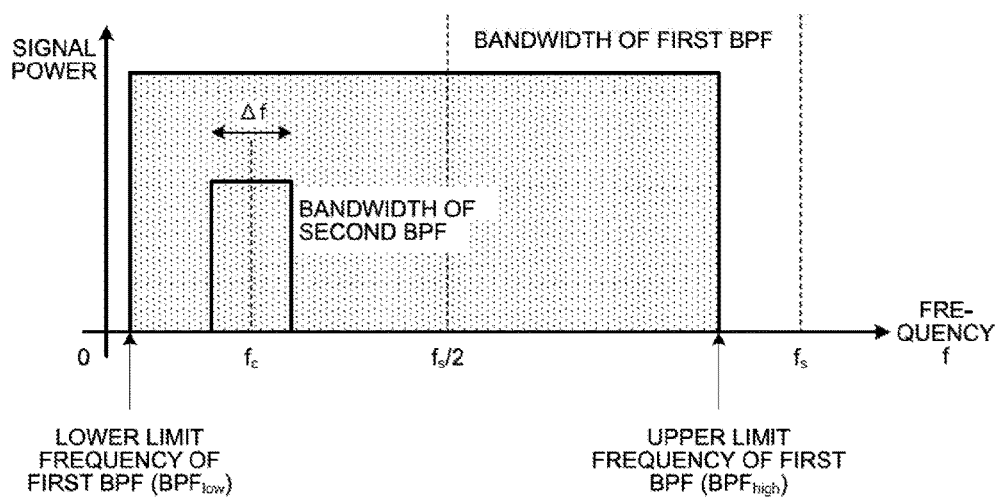
FIG. 3 is a diagram illustrating a relation example between frequency bandwidths extracted by a first Band Pass Filter (BPF) and a second BPF in a relation between a signal power and a signal frequency.

FIG. 3 is a diagram illustrating a relation example between frequency bandwidths extracted by the first BPF 14 and the second BPF 21 in a relation between a signal power and a signal frequency. Herein, "fs" illustrated in FIG. 3 is a sampling frequency of the ADC 15, "fs/2" is the Nyquist frequency that is defined as a half of the sampling frequency fs, "fc" is a canter frequency of the second BPF 21, and "Δf" is a pass frequency bandwidth of the second BPF 21. "$BPF_{low}$" is a lower limit frequency of a pass frequency band of the first BPF 14, and "$BPF_{high}$" is an upper limit frequency of a pass frequency band of the first BPF 14. The pass frequency bandwidth of the first BPF 14 is assumed to satisfy the following conditions: $0 \leq BPF_{low} < fc-\Delta f/2$, $fs/2+fc+\Delta f/2 \leq BPF_{high}$. The upper limit frequency $BPF_{high}$ is assumed to be a frequency that is in a higher band than that of the Nyquist frequency and is further assumed not to receive influence of wavelength dispersion, polarization mode dispersion, and waveform deterioration by non-linearity of a fiber. The first BPF 14 is to extract an AC component that includes a folding noise associated with digital conversion of an AC component of the ADC 15.

The second BPF 21 reversely brings in a folding noise in a higher frequency band than that of the Nyquist frequency to reduce variation when the noise intensity $N_{beat}$ of a monitor target is extracted from the noise intensity $N_{total}$ including a folding noise.

Figure 4:
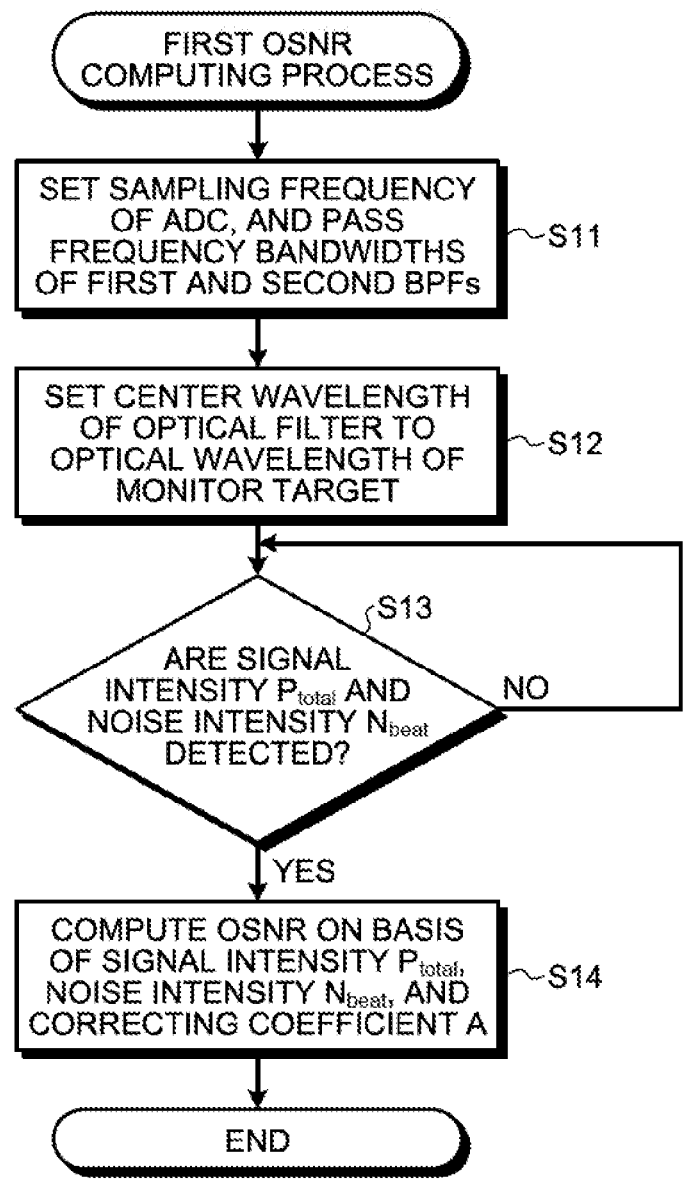
FIG. 4 is a flowchart illustrating one example of processing operations, of the monitor controller in the OSNR measuring device, which are associated with a first OSNR computing process.

Next, the operation of the OSNR measuring device 1 according to the first embodiment will be explained. FIG. 4 is a flowchart illustrating one example of processing operations, of the monitor controller 16 in the OSNR measuring device 1, which are associated with a first OSNR computing process. The first OSNR computing process illustrated in FIG. 4 is a process in which an OSNR is computed on the basis of the signal intensity $P_{total}$ of a photoelectrically converted electrical signal, the noise intensity $N_{beat}$ including a folding noise, and the correcting coefficient "A".

In FIG. 4, the first controller 24 in the monitor controller 16 sets, via the first setting unit 25, a sampling frequency of the ADC 15, a pass frequency bandwidth of the first BPF 14, and a pass frequency bandwidth of the second BPF 21 (Step S11). The first controller 24 sets, via the first setting unit 25, a center wavelength of the optical filter 11 to an optical wavelength of a monitor target (Step S12).

The computing unit 22 in the monitor controller 16 determines whether or not the signal intensity $P_{total}$ from the light intensity monitor 13 and the noise intensity $N_{beat}$ including a folding noise that is from the second BPF 21 are detected (Step S13). When detecting the signal intensity $P_{total}$ and the folding noise including the noise intensity $N_{beat}$ (Step S13: Yes), the computing unit 22 computes an OSNR, citing formulae (1) to (3), on the basis of the detected signal intensity $P_{total}$, the noise intensity $N_{beat}$ including a folding noise, and the correcting coefficient "A" (Step S14), and terminates a processing operation illustrated in FIG. 4. When not detecting the signal intensity $P_{total}$ or the noise intensity $N_{beat}$ including a folding noise (Step S13: No), the computing unit 22 shifts the processing to Step S13 to monitor whether or not the signal intensity $P_{total}$ and the noise intensity $N_{beat}$ are detected.

Figure 5:
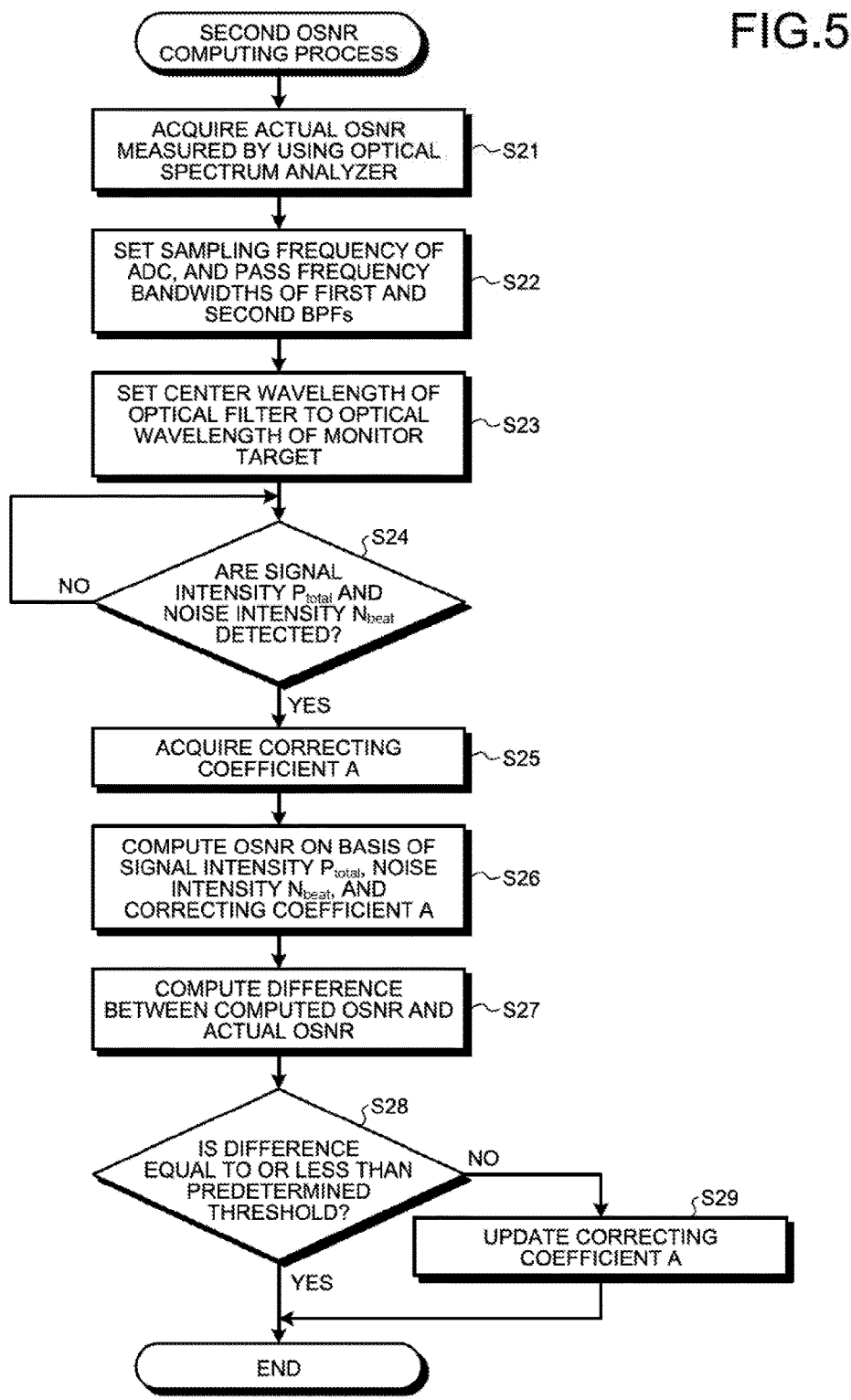
FIG. 5 is a flowchart illustrating one example of processing operations, of the monitor controller in the OSNR measuring device, which are associated with a second OSNR computing process.

FIG. 5 is a flowchart illustrating one example of processing operations, of the monitor controller 16 in the OSNR measuring device 1, which are associated with a second OSNR computing process. The second OSNR computing process illustrated in FIG. 5 is a process in which the correcting coefficient "A" is adjusted while computing an OSNR, and the adjusted correcting coefficient "A" is updated.

In FIG. 5, the monitor controller 16 acquires an actual OSNR measured by using an optical spectrum analyzer (not illustrated) (Step S21). The first controller 24 in the monitor controller 16 sets, via the first setting unit 25, a sampling frequency of the ADC 15, a pass frequency bandwidth of the first BPF 14, and a pass frequency bandwidth of the second BPF 21 (Step S22). The first controller 24 sets, via the first setting unit 25, a center wavelength of the optical filter 11 to an optical wavelength of a monitor target (Step S23).

The computing unit 22 determines whether or not the signal intensity $P_{total}$ that is from the light intensity monitor 13 and the noise intensity $N_{beat}$ including a folding noise that is from the second BPF 21 are detected (Step S24). When detecting the signal intensity $P_{total}$ and the noise intensity $N_{beat}$ (Step S24: Yes), the computing unit 22 acquires the correcting coefficient "A" from the correcting coefficient storage 23 (Step S25). The computing unit 22 computes, citing formulae (1) to (3), an OSNR on the basis of the detected signal intensity $P_{total}$, the noise intensity $N_{beat}$ including a folding noise, and the correcting coefficient "A" (Step S26). The first controller 24 computes the difference between the computed OSNR and an actual OSNR (Step S27), and determines whether or not the difference is equal to or less than a predetermined threshold (Step S28). In such a case that the difference is equal to or less than the predetermined threshold (Step S28: Yes), the first controller 24 terminates the processing operation illustrated in FIG. 5 while maintaining the present correcting coefficient "A".

In such a case that the difference is not equal to or less than the predetermined threshold (Step S28: No), the first controller 24 adjusts the correcting coefficient "A" so that the difference is minimum, updates the adjusted correcting coefficient "A" in the correcting coefficient storage 23 (Step S29), and terminates the processing operation illustrated in FIG. 5. In such a case that the signal intensity $P_{total}$ or the noise intensity $N_{beat}$ is not detected (Step S24: No), the computing unit 22 shifts the process to Step S24 to monitor whether or not the signal intensity $P_{total}$ and the noise intensity $N_{beat}$ are detected.

Figure 6A:
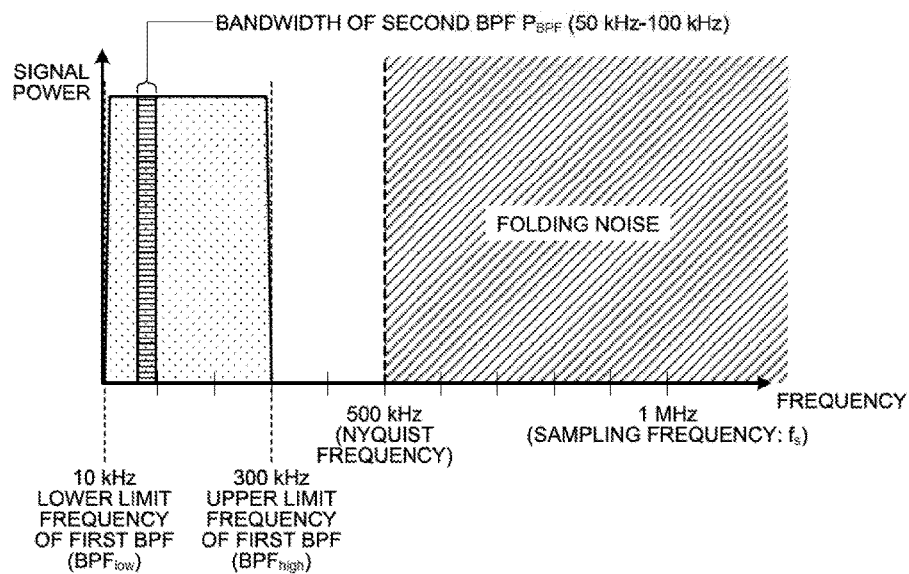
FIG. 6A is a diagram illustrating one example of a frequency bandwidth of the first BPF in a filter design without including a folding noise in a relation between a signal power and a signal frequency.

FIG. 6A is a diagram illustrating one example of a frequency bandwidth of the first BPF 14 in a filter design without including a folding noise in a relation between a signal power and a signal frequency. As illustrated in FIG. 6A, an upper limit frequency of a pass frequency band of the first BPF 14 is set so that it does not exceed the Nyquist frequency in order to remove the folding noise. For example, in such a case that the sampling frequency of the ADC 15 is 1 MHz and the Nyquist frequency is 500 kHz, a lower limit frequency of a pass frequency band of the first BPF 14 is set to 10 Hz and the upper limit frequency thereof is set to 300 kHz. As a result, the first BPF 14 extracts the noise intensity $N_{total}$ from an electrical signal in a pass frequency band that does not include a folding noise.

Figure 6B:
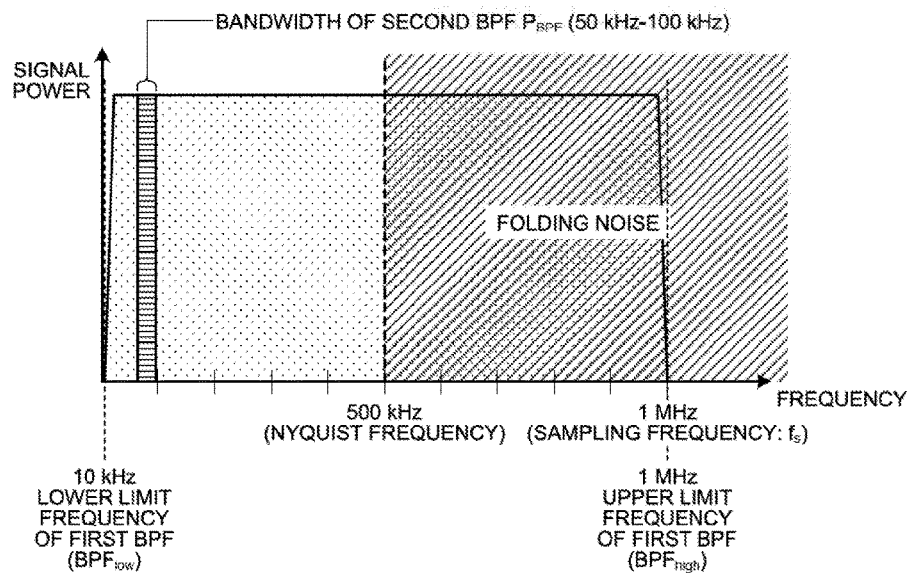
FIG. 6B is a diagram illustrating one example of a frequency bandwidth of the first BPF in a filter design including a folding noise in a relation between a signal power and a signal frequency.

On the other hand, FIG. 6B is a diagram illustrating one example of a frequency bandwidth of the first BPF in a filter design including a folding noise in a relation between a signal power and a signal frequency. As illustrated in FIG. 6B, an upper limit frequency of a pass frequency band of the first BPF 14 is set in a higher band than the Nyquist frequency in order to include a folding noise. For example, in such a case that a sampling frequency of the ADC 15 is 1 MHz and the Nyquist frequency is 500 kHz, the lower limit frequency of the pass frequency band of the first BPF 14 is set to 10 Hz and the upper limit frequency thereof is set to 1 MHz. As a result, the first BPF 14 extracts the noise intensity $N_{total}$ including a folding noise from an electrical signal in a pass frequency band including a folding noise.

FIG. 7 is a diagram illustrating one example of OSNR errors in pass frequency bands including a folding noise and without including a folding noise. As illustrated in FIG. 7, an OSNR computed by using the noise intensity $N_{beat}$ of a pass frequency band including a folding noise is proved to have higher accuracy compared with an OSNR computed by using that not including a folding noise.

In the OSNR measuring device 1 according to the first embodiment, an electrical signal, which is a result of electrical conversion of an optical signal, is branched and output to the light intensity monitor 13 and the ADC 15, the signal intensity $P_{total}$ is detected from the electrical signal by the light intensity monitor 13, and the noise intensity $N_{total}$ of a frequency band including a folding noise of the ADC 15 is extracted from the electrical signal by the first BPF 14. The OSNR measuring device 1 extracts the converted noise intensity $N_{beat}$ by using the second BPF 21. The OSNR measuring device 1 computes an OSNR to the optical signal on the basis of the signal intensity $P_{total}$, the noise intensity $N_{beat}$ of a frequency band including a folding noise, and the correcting coefficient "A". As a result, the OSNR measuring device 1 uses the noise intensity $N_{total}$ of a frequency band including a folding noise, and thus, the amount of an amplifier noise included in the noise intensity $N_{beat}$ relatively increases to the optical signal. Therefore, even in a case where a bandwidth is 0.2 nm or less, the deterioration in the monitoring accuracy of an OSNR can be reduced. In other words, by employing the OSNR measuring device 1, the deterioration in monitoring accuracy of an OSNR by constriction of a conventional frequency band can be reduced even in a super channel transmission system in which a frequency bandwidth of the optical filter 11 is constricted.

The computing unit 22 in the OSNR measuring device 1 acquires the noise intensity $N_{beat}$ of a monitor target from the converted noise intensity $N_{total}$, and further computes an OSNR on the basis of the signal intensity $P_{total}$, the noise intensity $N_{beat}$ of the monitor target, and the correcting coefficient "A". As a result, by employing the OSNR measuring device 1, deterioration in the monitoring accuracy of an OSNR can be reduced even in a super channel transmission system in which a bandwidth of the optical filter 11 is constricted.

The first setting unit 25 of the OSNR measuring device 1 automatically sets a pass frequency band of the first BPF 14, a pass frequency band of the second BPF 21, and a sampling frequency of the ADC 15 in accordance with a specified wavelength. As a result, the OSNR measuring device 1 can automatically set setting contents of the first BPF 14, the second BPF 21, and the ADC 15 in accordance with a specified wavelength of the optical filter 11.

The upper limit frequency of the pass frequency band, which is set by using the first BPF 14 in the OSNR measuring device 1, is in a higher band than the Nyquist frequency that is a half of a sampling frequency of the ADC 15. As a result, the first BPF 14 can extract the noise intensity $N_{total}$ including a folding noise from an electrical signal.

The computing unit 22 in the OSNR measuring device 1 stores the correcting coefficient "A" in the correcting coefficient storage 23 so that an actual OSNR can be computed by using the computed OSNR on the basis of the signal intensity $P_{total}$ and the noise intensity $N_{beat}$. The computing unit 22 computes an OSNR on the basis of the signal intensity $P_{total}$, the noise intensity $N_{beat}$, and the correcting coefficient "A". As a result, the computing unit 22 can compute an OSNR with the high monitoring accuracy, which approximates to an actual OSNR.

The aforementioned computing unit 22 according to the first embodiment computes an OSNR on the basis of the signal intensity $P_{total}$, the noise intensity $N_{beat}$, and the correcting coefficient "A". However, an OSNR may be computed on the basis of the signal intensity $P_{total}$ and the noise intensity $N_{beat}$ instead of using the correcting coefficient.

The monitor controller 16 in the aforementioned OSNR measuring device 1 according to the first embodiment extracts the noise intensity $N_{beat}$ of a monitor target from the noise intensity $N_{total}$ including a folding noise in the first BPF 14, and further computes an OSNR on the basis of the signal intensity $P_{total}$ and the noise intensity $N_{beat}$ of a monitor target. However, not limited to the monitor controller 16 illustrated in FIG. 2, it may be appropriately modified, and thus, will be explained hereinafter as a second embodiment with regard to the modified embodiment.

[b] Second Embodiment

Figure 8:
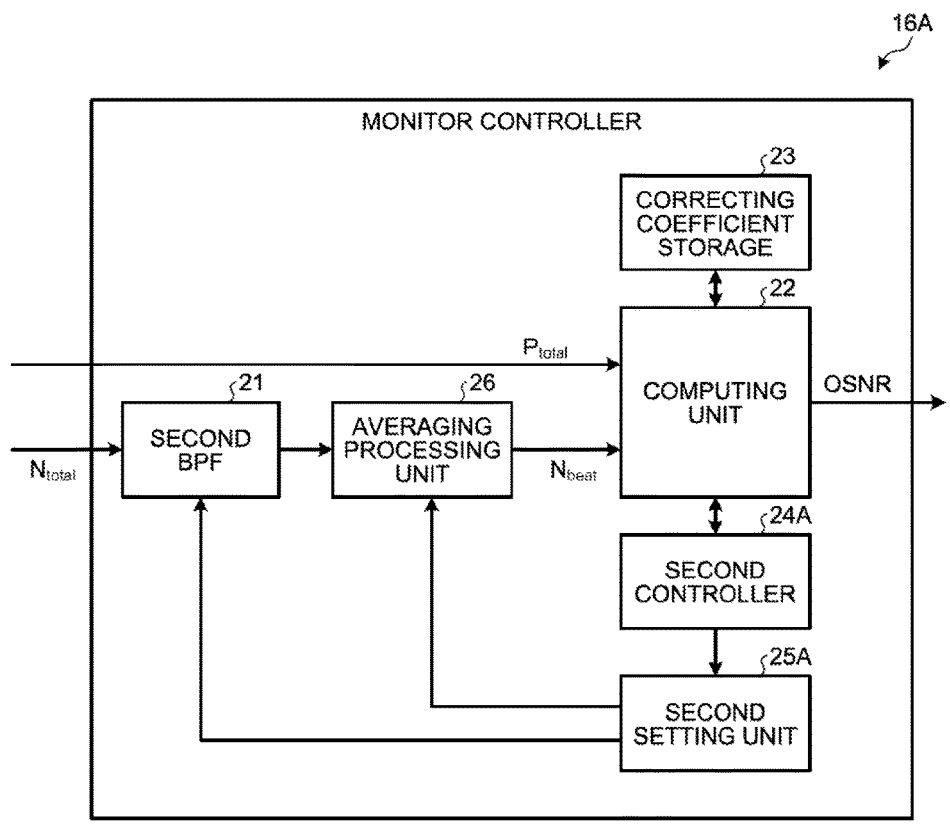
FIG. 8 is a block diagram illustrating a configuration example of a monitor controller in an OSNR measuring device according to a second embodiment.

FIG. 8 is a block diagram illustrating a configuration example of a monitor controller 16A in an OSNR measuring device 1 according to a second embodiment. The configuration same as that of the monitor controller 16 illustrated in FIG. 2 will be followed by the same reference symbols as those illustrated in FIG. 2, and thus, explanation about the duplicate configuration and operation will be omitted.

The monitor controller 16A illustrated in FIG. 8 includes an averaging processing unit 26, a second controller 24A, and a second setting unit 25A other than the second BPF 21, the computing unit 22, and the correcting coefficient storage 23. The averaging processing unit 26 is a processing unit that is arranged between the second BPF 21 and the computing unit 22, and averages, at a predetermined averaging count, the noise intensity $N_{beat}$ of a monitor target extracted in the second BPF 21. The second controller 24A controls whole of the monitor controller 16A. The second setting unit 25A sets a sampling frequency of the ADC 15, a pass frequency band of the first BPF 14, a pass frequency band of the second BPF 21, and averaging count of the averaging processing unit 26.

The computing unit 22 computes an OSNR by using formulae (1) to (3) on the basis of the signal intensity $P_{total}$ of the light intensity monitor 13, the noise intensity $N_{beat}$ of a monitor target that is averaged in the averaging processing unit 26, and the correcting coefficient "A".

The monitor controller 16A according to the second embodiment computes an OSNR on the basis of the signal intensity $P_{total}$ of the light intensity monitor 13, the averaged noise intensity $N_{beat}$ of a monitor target, and the correcting coefficient "A". As a result, the averaging the noise intensity $N_{beat}$ of a monitor target leads to usage of a noise component with high accuracy, and thus, an OSNR with high accuracy can be acquired.

[c] Third Embodiment

Figure 9:
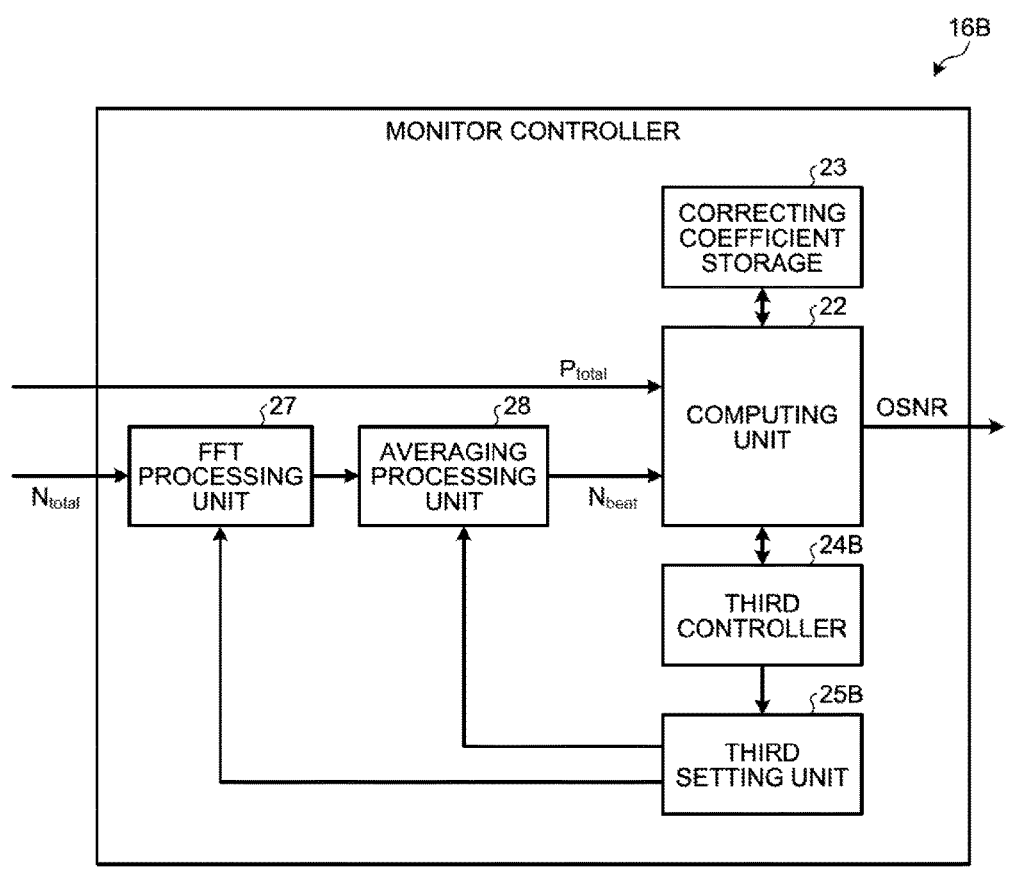
FIG. 9 is a block diagram illustrating a configuration example of a monitor controller in an OSNR measuring device according to a third embodiment.
Figure 10:
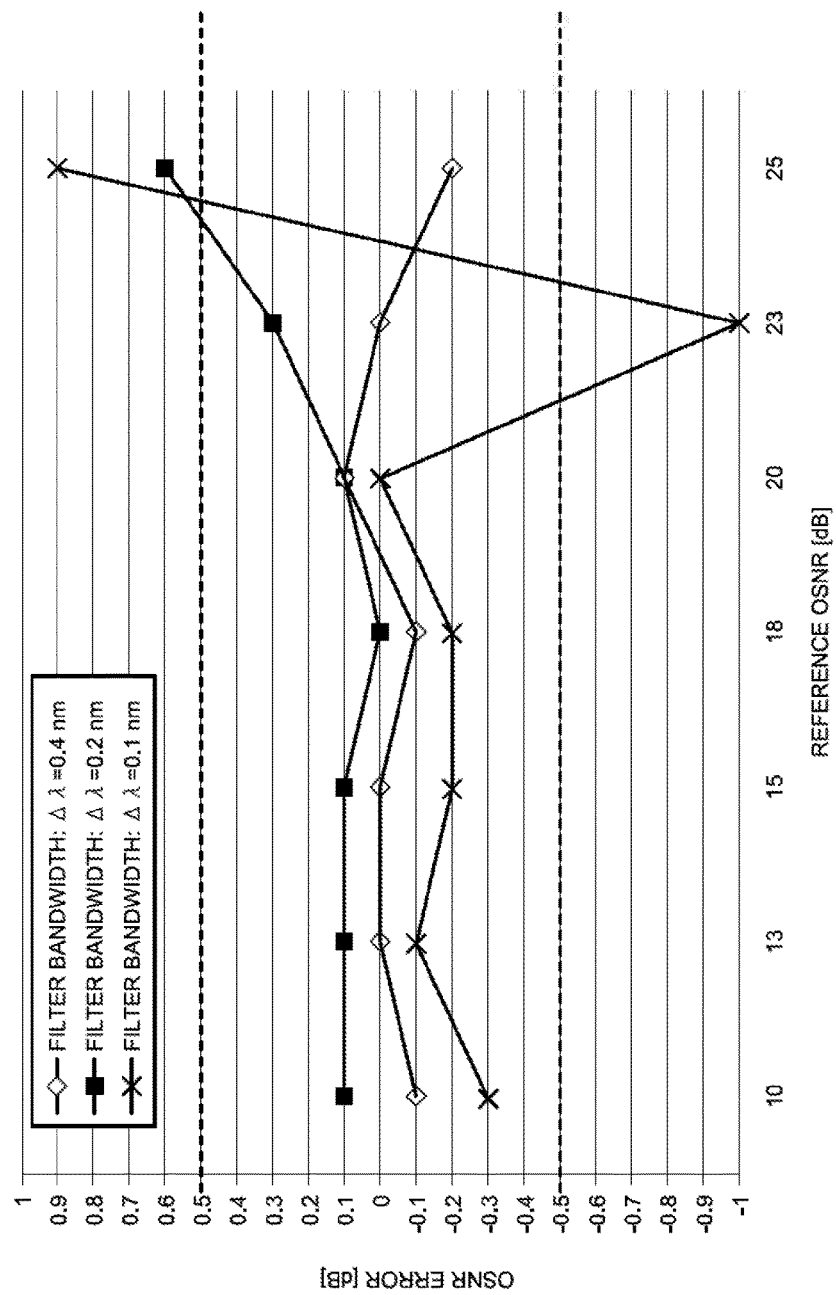
FIG. 10 is a diagram illustrating one example of an error between an OSNR computed by a conventional OSNR measuring device and a reference OSNR for each filter bandwidth.

FIG. 9 is a block diagram illustrating a configuration example of a monitor controller 16B in an OSNR measuring device 1 according to a third embodiment. The configuration same as that of the monitor controller 16 illustrated in FIG. 2 will be followed by the same reference symbols as those illustrated in FIG. 2, and thus, explanation about the duplicate configuration and operation will be omitted.

The monitor controller 16B illustrated in FIG. 9 includes a Fourier Fast Transformer processing unit (FFT processing unit) 27, an averaging processing unit 28, a third controller 24B, and a third setting unit 25B other than the computing unit 22 and the correcting coefficient storage 23.

The FFT processing unit 27 converts the noise intensity $N_{total}$ extracted in the first BPF 14 to a frequency domain signal that is corresponding to the noise intensity $N_{beat}$ of a monitor target. The averaging processing unit 28 is a processing unit that is arranged between the FFT processing unit 27 and the computing unit 22, and averages the noise intensity $N_{beat}$ of a monitor target, which is the frequency domain signal converted in the FFT processing unit 27, at a predetermined averaging count. The third controller 24B controls whole of the monitor controller 16B. The third setting unit 25B sets a sampling frequency of the ADC 15, a pass frequency band of the first BPF 14, a frequency domain signal of a monitor target of the FFT processing unit 27, and averaging count of the averaging processing unit 28.

The computing unit 22 computes an OSNR by using formulae (1) to (3) on the basis of the signal intensity $P_{total}$ of the light intensity monitor 13, the noise intensity $N_{beat}$ of the monitor target that is averaged in the averaging processing unit 28, and the correcting coefficient "A".

The monitor controller 16B according to the third embodiment computes an OSNR on the basis of the signal intensity $P_{total}$ of the light intensity monitor 13, the averaged noise intensity $N_{beat}$ of a monitor target, and the correcting coefficient "A". As a result, the averaging the noise intensity $N_{beat}$ of a monitor target leads to usage of a noise component with high accuracy, and thus, an OSNR with high accuracy can be measured.

Moreover, a Discrete Fourier Transformer processing unit (DFT processing unit) may be used instead of the FFT processing unit 27 according to the third embodiment.

In addition, each component of each apparatus illustrated in the drawings is functionally conceptual, and thus, does not always physically configured as illustrated in the drawings. Namely, a specific mode of separation or integration of each apparatus is not limited to that illustrated in the drawings. That is, all or some of the components can be configured by separating or integrating them functionally or physically in any unit, according to various types of loads, the status of use, etc.

Furthermore, all or arbitrary ones of processing functions may be executed by a Central Processing Unit (CPU) (or a microcomputer such as a Micro Processing Unit (MPU) or a Micro Controller Unit (MCU)), and further may be executed by a program, which is analyzed and executed by the CPU (or microcomputer such as MPU or MCU), or hardware by the wired logic.

According to an aspect of the embodiments, an OSNR can be measured with high accuracy.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An optical signal-to-noise ratio (OSNR) measuring device comprising:
    a photo detector that converts an optical signal to an electrical signal;
    a light intensity monitor that acquires a signal intensity from the electrical signal;
    a first band pass filter that acquires a noise intensity of a predetermined frequency band from the electrical signal;
    an analog digital converter that converts the noise intensity digitally; and
    a processor that computes an OSNR of the optical signal based on the signal intensity and the converted noise intensity, wherein
    the predetermined frequency band is a frequency band including a folding noise that occurs when the electrical signal is digitally converted, and
    an upper limit frequency of the frequency band of the noise intensity acquired by the first band pass filter is in a higher band than a Nyquist frequency that is half of a sampling frequency by the analog digital converter.

2. The OSNR measuring device according to claim 1, further comprising:
    a second band pass filter that acquires a noise intensity of a monitoring target from the converted noise intensity, wherein
    the processor further computes the OSNR of the optical signal based on the signal intensity and the noise intensity of the monitoring target.

3. The OSNR measuring device according to claim 2, wherein
    the processor further sets a pass frequency band acquired by the first band pass filter, a pass frequency band acquired by the second band pass filter, and a sampling frequency by the analog digital converter.

4. The OSNR measuring device according to claim 1, further comprising:
    a memory that stores a correcting coefficient so that the OSNR computed based on the signal intensity and the converted noise intensity approximates to an actual OSNR, wherein
    the processor further computes the OSNR based on the signal intensity, the noise intensity, and the correcting coefficient.

5. An optical signal-to-noise ratio (OSNR) measuring method comprising:
    first converting an optical signal to an electrical signal;
    first acquiring a signal intensity from the electrical signal;
    second acquiring from the electrical signal a noise intensity of a frequency band including a folding noise that occurs when the electrical signal is digitally converted;
    second converting the noise intensity acquired at the second acquiring digitally; and
    computing, by the processor, an OSNR of the optical signal based on the signal intensity and the converted noise intensity, wherein
    an upper limit frequency of the frequency band of the noise intensity acquired at the second acquiring is in a higher band than a Nyquist frequency that is half of a sampling frequency at the second converting.

* * * * *